(12) United States Patent
Beck et al.

(10) Patent No.: US 7,349,619 B2
(45) Date of Patent: Mar. 25, 2008

(54) FIBER SERVICE BLOCKER

(75) Inventors: Ronald A. Beck, Mendota Heights, MN (US); Scott C. Kowalczyk, Savage, MN (US)

(73) Assignee: ADC Telecommunications, Inc., Eden Prairie, MN (US)

(*) Notice: Subject to any disclaimer, the term of this patent is extended or adjusted under 35 U.S.C. 154(b) by 103 days.

(21) Appl. No.: 11/138,667

(22) Filed: May 25, 2005

(65) Prior Publication Data

US 2006/0269212 A1  Nov. 30, 2006

(51) Int. Cl.
*G02B 6/38* (2006.01)

(52) U.S. Cl. ............... 385/139; 385/134; 385/135; 385/55; 385/59; 385/60; 385/70; 385/71; 385/72

(58) Field of Classification Search ........... 385/134, 385/135, 139, 55, 60, 70, 59, 71, 72
See application file for complete search history.

(56) References Cited

U.S. PATENT DOCUMENTS

| | | | |
|---|---|---|---|
| 5,619,610 | A | 4/1997 | King et al. |
| 6,102,581 | A | 8/2000 | Deveau et al. |
| 6,240,229 | B1 | 5/2001 | Roth |
| 6,438,310 | B1 | 8/2002 | Lance et al. |
| 6,461,053 | B1* | 10/2002 | Mayercik et al. ......... 385/59 |
| 6,504,988 | B1 | 1/2003 | Trebesch et al. |
| 6,612,750 | B1 | 9/2003 | Bull et al. |
| 6,688,780 | B2* | 2/2004 | Duran ................ 385/76 |
| 6,715,928 | B1 | 4/2004 | Matasek et al. |
| 7,167,628 | B2* | 1/2007 | Beck ................. 385/139 |
| 2003/0002812 | A1 | 1/2003 | Lampert |
| 2003/0147618 | A1 | 8/2003 | Guy et al. |
| 2004/0161202 | A1 | 8/2004 | Estrella et al. |
| 2005/0213897 | A1 | 9/2005 | Palmer et al. |
| 2006/0127028 | A1 | 6/2006 | Beck |
| 2007/0025674 | A1* | 2/2007 | Kowalczyk et al. ........ 385/134 |

FOREIGN PATENT DOCUMENTS

| | | |
|---|---|---|
| DE | 37 35 038 A1 | 4/1989 |
| EP | 0 341 919 A2 | 11/1989 |
| EP | 0 967 497 A1 | 12/1999 |

(Continued)

OTHER PUBLICATIONS

King, W. et al., "Low-Cost Connector-Type Optical Terminators," *Electronic Components and Technology Conference*, pp. 414-418 (1997).

(Continued)

*Primary Examiner*—Frank G. Font
*Assistant Examiner*—James P. Hughes
(74) *Attorney, Agent, or Firm*—Merchant & Gould P.C.

(57) ABSTRACT

A device and method of blocking customer access to a fiber optic distribution cable. A service blocker is positioned between a fiber distribution cable and a customer drop cable within a fiber optic adapter. The service blocker includes a unitary body which does not permit optical transmission between the fiber distribution cable and the customer drop cable. The service blocker includes a first end configured to be inserted within the fiber optic adapter and a second end configured receive a fiber optic cable connector. A system for mounting fiber optic cables including a service blocker positioned within a bulkhead mounted adapter between two fiber optic cables.

13 Claims, 12 Drawing Sheets

FOREIGN PATENT DOCUMENTS

WO    WO 2005/006783 A2    1/2005

OTHER PUBLICATIONS

ADC Telecommunications, Inc., Network Connectivity Sol'ns Doc. No. M143, dated Aug. 2003, cover and p. 174.

ADC Telecommunications, Inc., Fiber Optic Adapter with DustPlugs © 2005, 1 page.

ADC Telecommunications, Inc., ADC FasTerm Singlemode ST Installation Instructions, Doc. No. 1077662 Rev A © 1999, 25 pp.

ADC Telecommunications, Inc., ADC FasTerm Multimode SC Connector Installation Instructions, Doc. No. 1077650 Rev A © 1999, 22 pp.

Sys. Concept Inc., Dust Caps web page with prints of various products listed on the web page © 2003-2005, 14 pp.

* cited by examiner

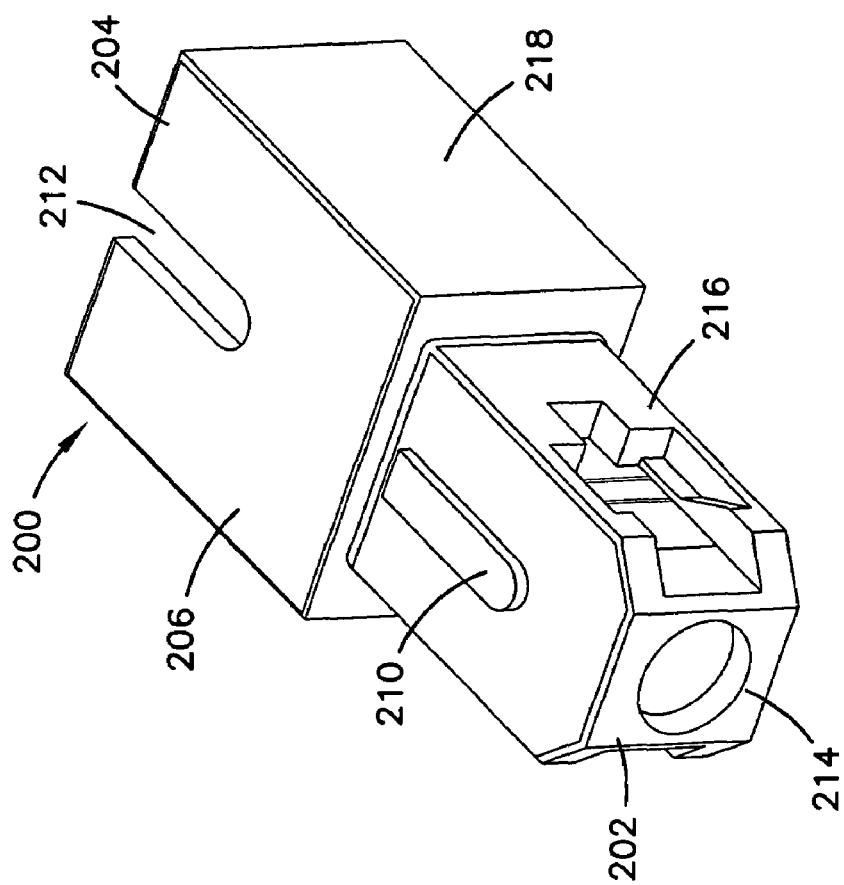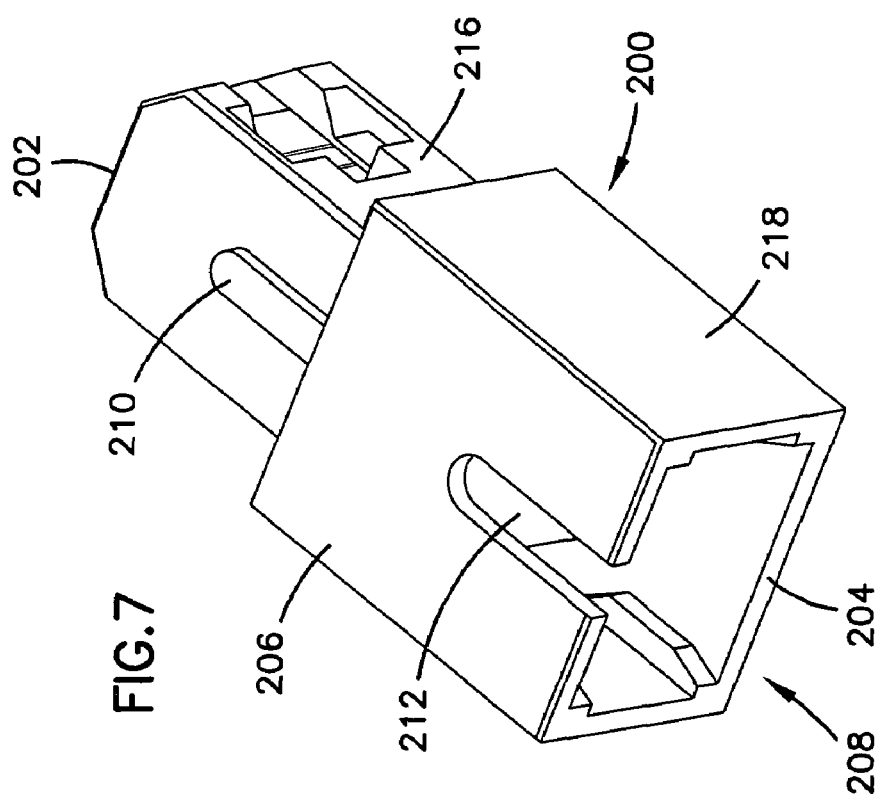

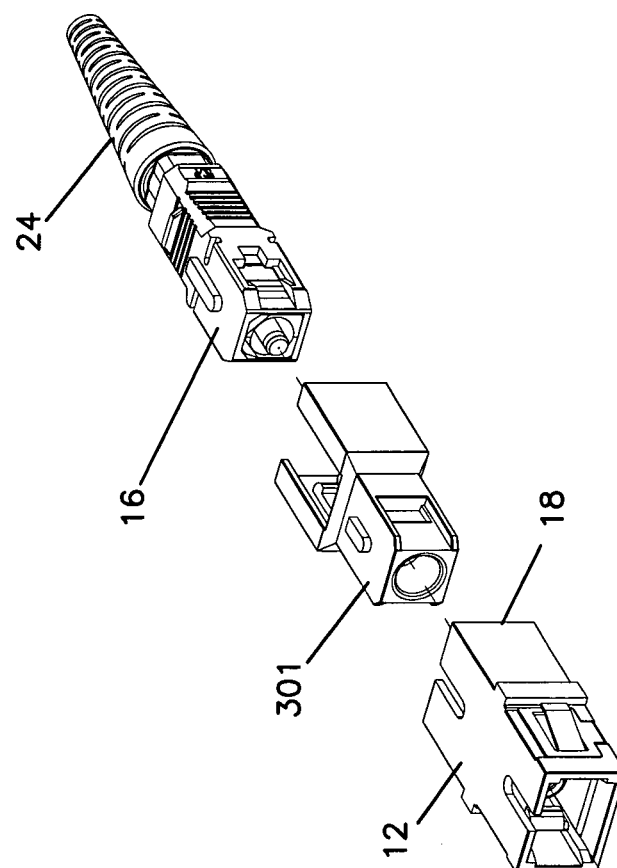
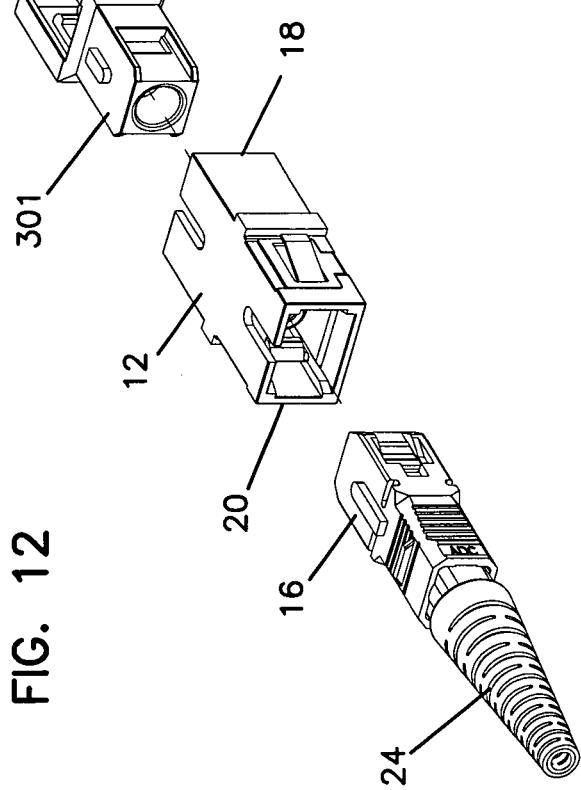
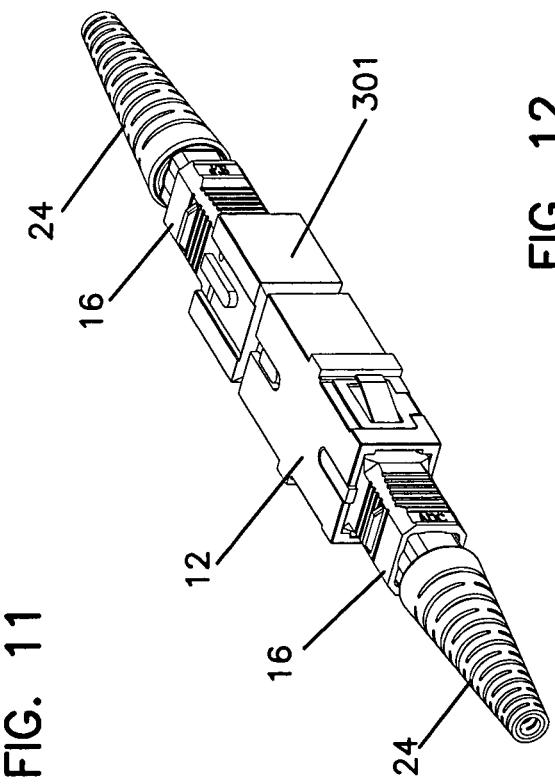
FIG. 11
FIG. 12

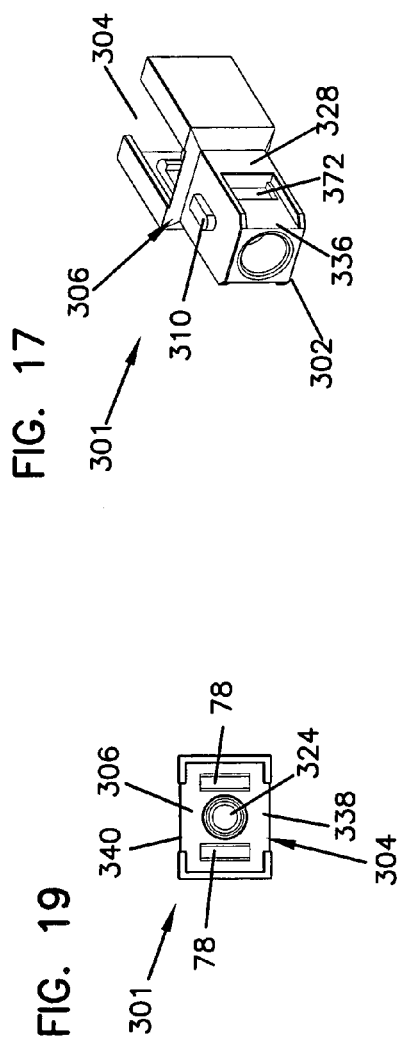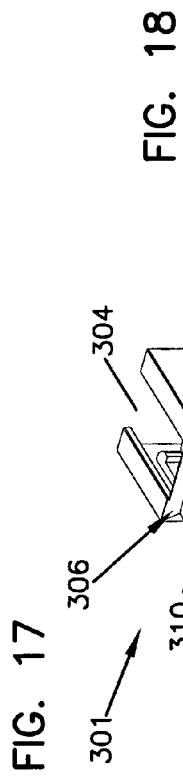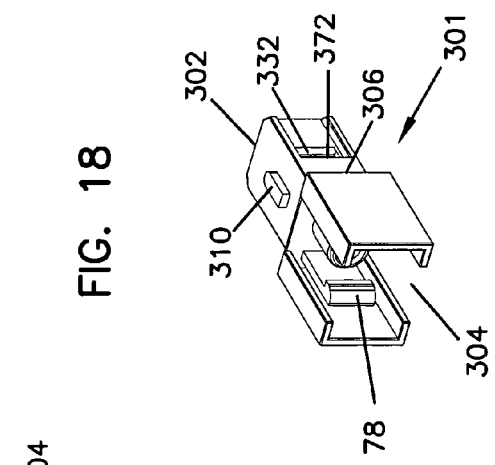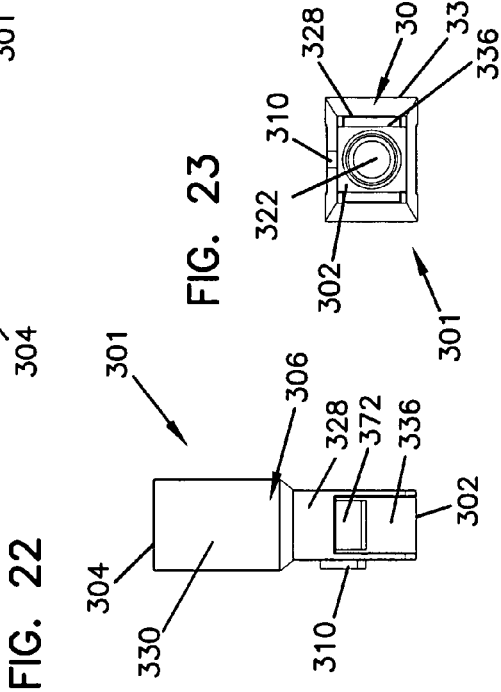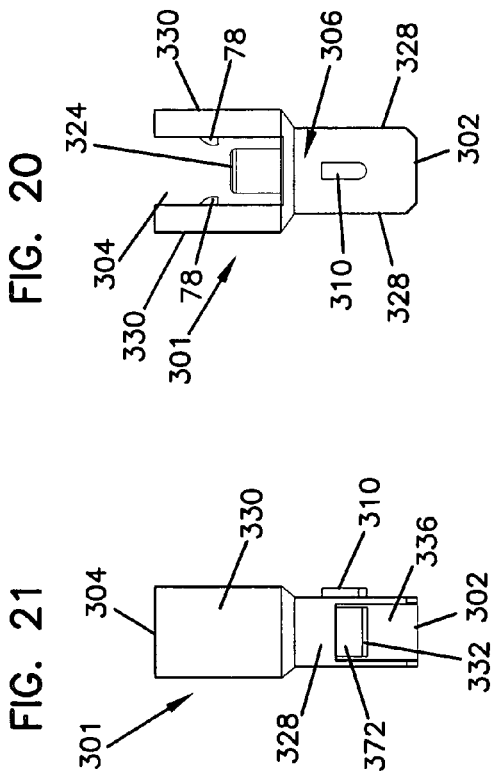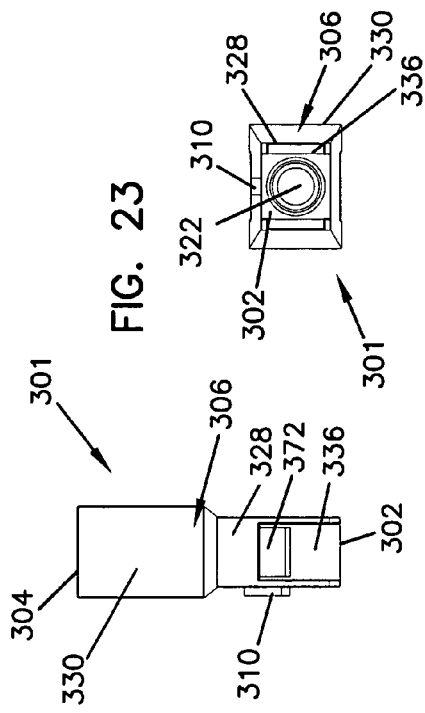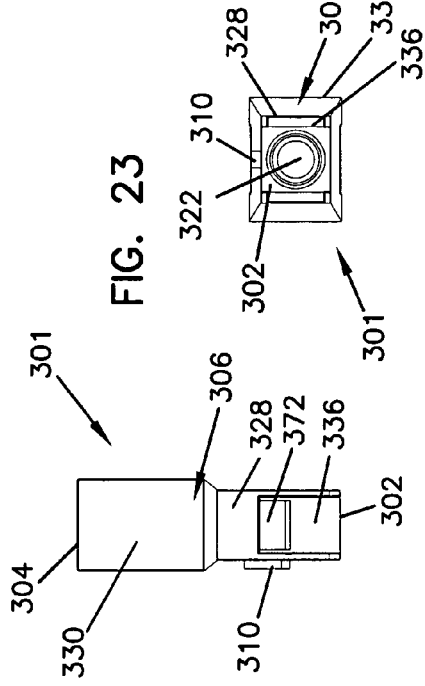

FIBER SERVICE BLOCKER

RELATED APPLICATION

This application relates to commonly-owned U.S. patent application Ser. No. 11/010,460, filed Dec. 13, 2004, the disclosure of which is incorporated herein by reference.

TECHNICAL FIELD

The present invention relates generally to provision of optical fiber telecommunications service. More specifically, the present invention relates to a device for blocking a connection between a customer and optical fiber services.

BACKGROUND

As demand for telecommunications services increases, optical fiber services are being extended into more and more areas. Often, it is more cost effective to provide for greater service capacity than current demand warrants. This will allow a telecommunications service provider to quickly and cost-effectively respond to future growth in demand. Optical fiber cables may be extended to a customer's premises prior to that customer actually requesting or needing service. Such cables may be extended to premises adjacent the premises of a current customer, as it may be cost effective to extend both cables at the same time, or the cables may be extended to new building sites in anticipation of the new occupants of those sites requesting fiber optic service.

When cables are extended in anticipation of future service expansion, it is desirable to provide for blocking illumination of the future customers drop cable prior to that customer requesting the service.

SUMMARY

The present invention relates to a service blocking device with a unitary body including a first end and a second end. The first end is configured to be received within an opening of a fiber optic adapter. The second end includes a connector opening sized to receive a fiber optic connector and a ferrule opening configured to receive a ferrule of the connector. The fiber optic connector is configured to be received within the opening of the fiber optic adapter. The body is configured so that the fiber optic connector is held generally coaxially aligned with the opening of the adapter when the first end of the body is within the opening of the adapter and the second end of the body is positioned about the ferrule of the fiber optic connector. The body includes an opaque bulkhead between the first end and the second end to prevent light from passing through the body.

The present invention further relates to a fiber optic connector and a fiber optic adapter with a service blocker having a unitary body positioned between them. The present invention also relates to a service blocking device with a unitary body having a first connector end and a second adapter end. The first connector end is sized for insertion with a fiber optic adapter and the second adapter end includes an opening sized to receive a fiber optic connector. The body includes an opaque bulkhead to prevent light from passing through the body.

BRIEF DESCRIPTION OF THE DRAWINGS

The accompanying drawings, which are incorporated in and constitute a part of the specification, illustrate several aspects of the present invention and together with the description, serve to explain the principles of the invention. A brief description of the drawings is as follows:

FIG. 7 is a perspective view of a second embodiment of a service blocking device according to the present invention.

FIG. 8 is a second perspective view of the service blocking device of FIG. 7, viewed from the opposite end.

FIG. 11 is a perspective view of a pair of connectors and an adapter with a fourth embodiment of a service blocker according to the present invention inserted between one of the fiber optic connector and the adapter.

FIG. 12 is an exploded perspective view of the connectors, adapter and service blocker of FIG. 11.

FIG. 17 is a first perspective view of the service blocker of FIG. 11.

FIG. 18 is a second perspective view of the service blocker of FIG. 11.

FIG. 19 is a second end of the service blocker of FIG. 11.

FIG. 20 is a top view of the service blocker of FIG. 11.

FIG. 21 is a first side view of the service blocker of FIG. 11.

FIG. 22 is a second side view of the service blocker of FIG. 11.

FIG. 23 is a first end view of the service blocker of FIG. 11.

DETAILED DESCRIPTION

Reference will now be made in detail to the exemplary aspects of the present invention that are illustrated in the accompanying drawings. Wherever possible, the same reference numbers will be used throughout the drawings to refer to the same or like parts.

Figure 1:
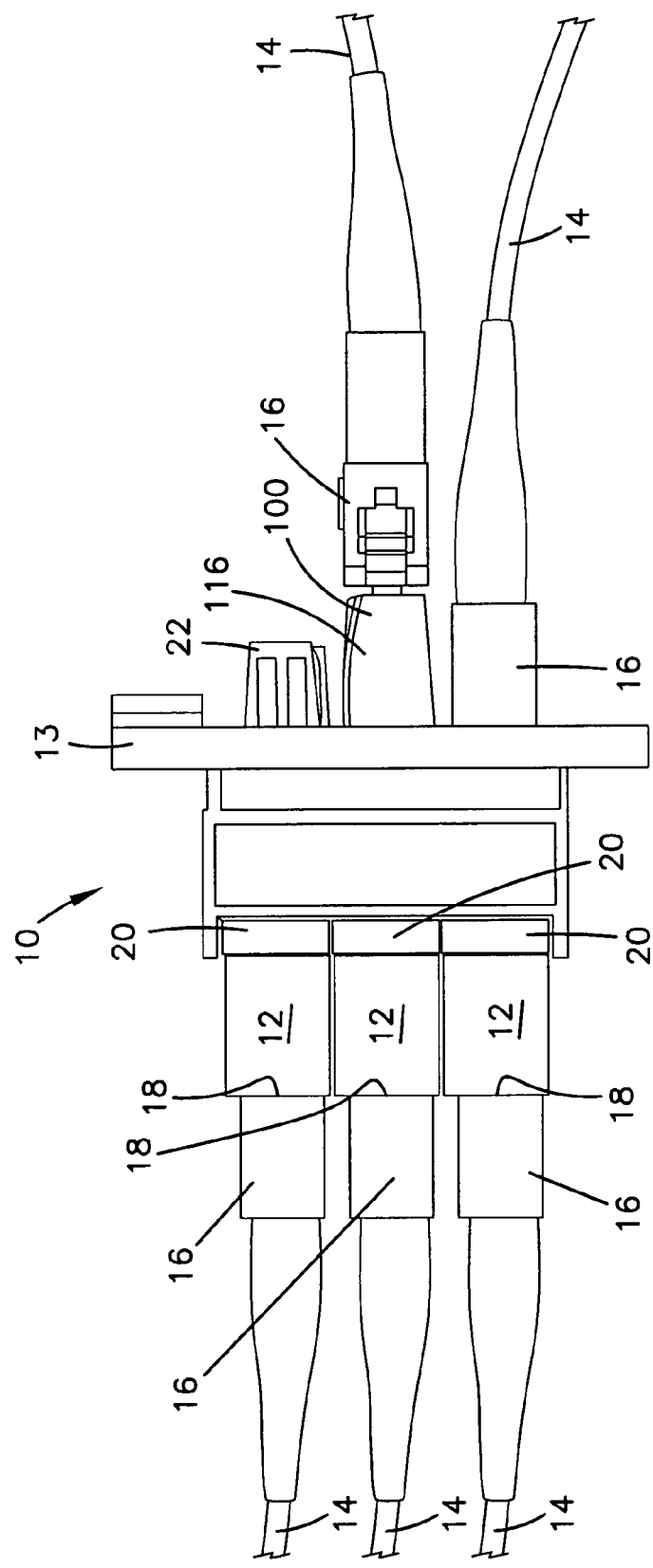
FIG. 1 is a side view of a telecommunications connection block for fiber optic cables terminated with connectors, with a service blocking device inserted between one of the connectors and the adapter.

FIG. 1 illustrates a sliding adapter pack 10 including a three fiber optic adapters 12 mounted in a sliding frame 13. Adapter packs such as theses shown in commonly owned U.S. Pat. Nos. 6,504,988 and 6,438,310, the disclosures of which are incorporated herein by reference. However the adapters may be mounted or held, such as mounted to a bulkhead, a panel, within a drawer, or other piece of equipment, the discussion below regarding fiber optic cables, connectors and adapters is generally applicable. While FIG. 1 illustrates adapters 12 mounted within sliding pack 10, adapters 12 could be mounted in a variety of other settings, either alone, in combination with each other, or in conjunction a plurality of other adapters 12. Adapters 12 align fiber optic connectors, such as connectors 16, which terminate fiber optic cables, such as cables 14, to permit optical signals to be transmitted from one cable 14 to another cable 14, such as shown in the lowest positioned adapter 12 in sliding frame 13. Adapter 12 includes a first end 18 and a second opposing end 20 for receiving connectors 16. As shown, both ends of adapter 12 are adapted to receive and optically connect connectors 16 which conform to a known SC format. Alternatively, adapters 12 may be configured to receive and optically connect connectors 16 that conform to other formats and styles.

As shown in FIG. 1, one of the connectors 16 is inserted within first end 18 of the top most adapter 12 and an adapter dust cap 22 is inserted within second end 20 of that adapter 12. Adapter dust cap 22 fits closely within one of the openings 18 and 20 to provide a seal against intrusion of dust or other contaminants into adapter 12. As shown in the lower most adapter 12, another connector 16 terminating another cable 14 could be inserted within second end 20 of the same adapter 12 so that the two cables 14 could be optically connected. The upper and lower adapters in FIG. 1 illustrate those connection or disconnection arrangements of connectors that are currently used in the telecommunications industry.

The cable/adapter arrangement shown in the lowest position in FIG. 1 is well known in the telecommunications industry and permits, for example, customer service or drop cables to be connected to fiber optic distribution cables to provide fiber optic service to a customer. However, when a customer drop cable has been extended to a customer premises prior to and in anticipation of that customer requesting the service, it is desirable that the optical path between the two cables 14 be broken. One current method of breaking the optical path is illustrated in the top most position in FIG. 1, where one of the cables 14 is removed from the adapter 12 and adapter dust cap 22 inserted in its place. The removed cable 14 is then stored somewhere else within the installation in anticipation of connecting the two cables at the top most adapter 12. It is also desirable to have the two cables 14 positioned as closely as possible to each other so that turning on service to the customer upon request is simple and efficient. Since some installations of connection locations include a large number of adapters 12, it is desirable that those connections between cables which have been interrupted be quickly visible to a field technician.

Between the connector 16 and adapter 12 in the middle position of sliding frame 13, a service blocking device 100 is positioned. Service blocking device 100 maintains the connector 16 generally in alignment with adapter 12, but interrupts the optical path from the terminal end of cable 14 held by connector 16. As can be seen from FIG. 1, device 100 provides an offset mounted of connector 16 to adapter 12, making the location of connectors where service has been interrupted fairly obvious, even in a crowded enclosure. Device 100 may also have an exterior color which is distinct from other colors found adjacent adapters 12 and distinct from the connectors 16 and cables 14. This will further assist in a quick visual indication of which circuits include devices 100 when a technician accesses a service panel.

It is desirable that adapters 12 might be installed in a factory pre-wired panel with cables 14 extending to both sides of adapters 12 and service blocking devices 100 in place between cables and cables 14 on one side of the panel.

Figure 2:
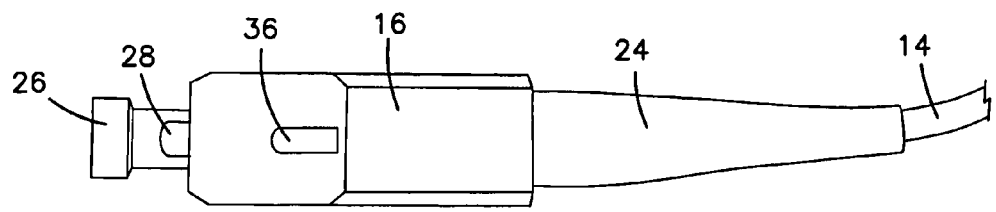
FIG. 2 is a side view of a fiber optic telecommunications cable with a prior art dust cap positioned about a terminal end of the optical fiber within the cable.
Figure 3:
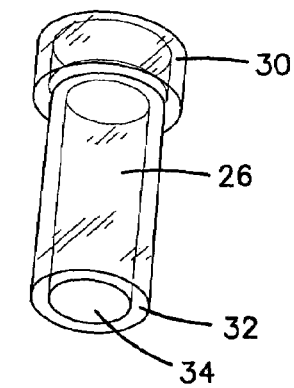
FIG. 3 is a perspective view of the prior art dust cap of FIG. 2.

Referring now to FIG. 2, connector 16 is shown with a known connector dust cap 26 positioned about a ferrule 28 held by connector 16. The terminal end of the optical fiber within cable 14 is held by ferrule 28. Connector dust cap 26 fits tightly about ferrule 28 to protect the terminal end from dust or other contaminants when connector 16 is not in use transmitting optical signals. Connector dust cap 26, as shown in FIG. 3, includes an enlarged end 30 to permit grasping of dust cap 26 to remove it from ferrule 28 of connector 16, and an opening 34 at an opposite end 32. Opening 34 is sized to receive and closely fit about ferrule 28 of connector 16. As shown, connector dust cap 26 is often made of a clear pliable material and its size will not permit it to be received within either opening 18 or 20 of adapter 12. Connector 16 also includes a keying feature 36, which engages a mating recess or slot of adapter 12 to ensure that connector 16 is inserted within adapter 12 is the correct orientation.

Figure 4:
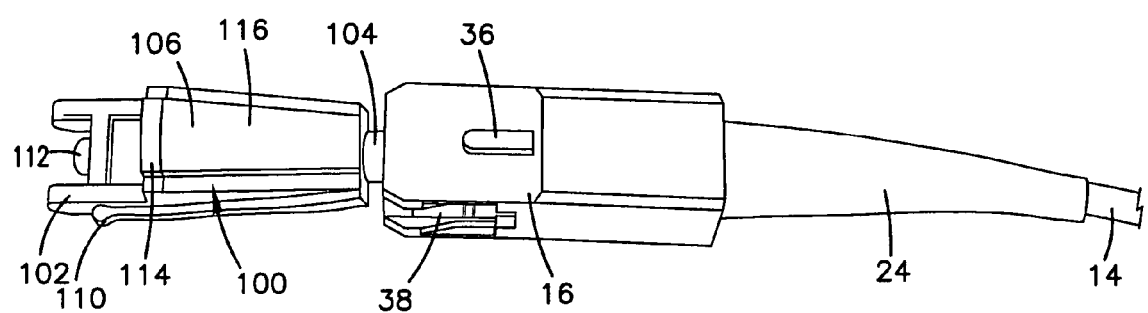
FIG. 4 is a side view of the service blocking device and one of the fiber optic telecommunications cables of FIG. 1, removed from the adapter.
Figure 6:
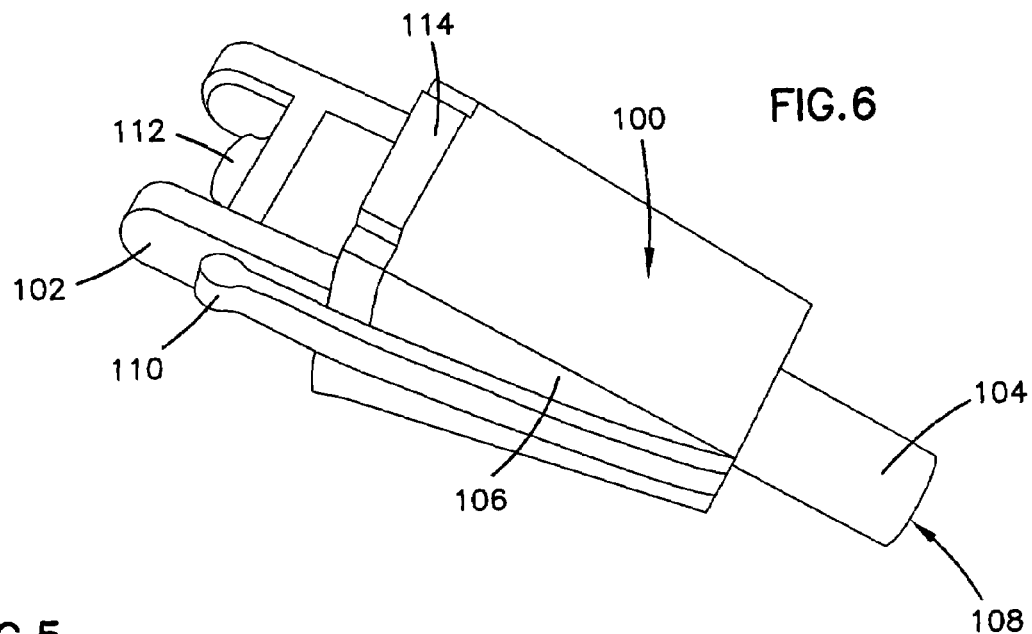
FIG. 6 is a side perspective view of the service blocking device of FIG. 5.
Figure 5:
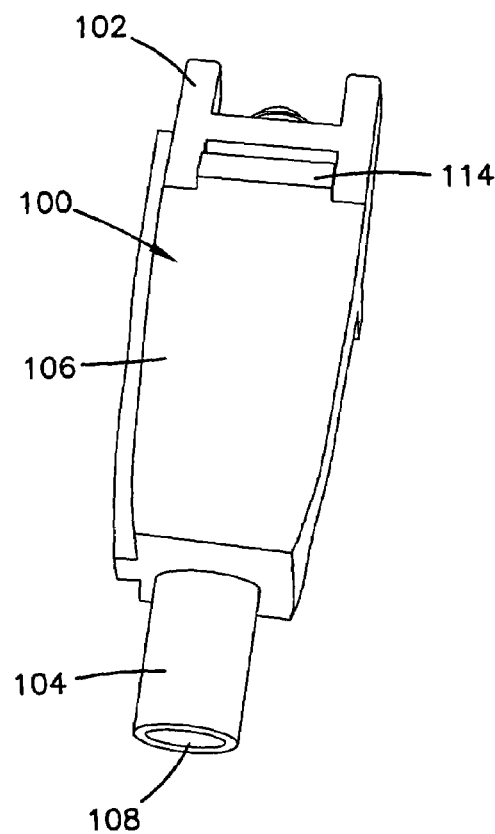
FIG. 5 is an end perspective view of the service blocking device of FIG. 4, removed from the connector.

FIG. 4 shows connector 16 with service blocking device 100 mounted about ferrule 28. Service blocking device 100 includes a body 106 with a first end 102 configured similar to adapter dust cap 22 for being received with one of the ends 18 and 20 of adapter 12, and a second opposing end 104 sized to receive and fit closely about ferrule 28. First end 102 of service blocking device 100 acts as a dust cap to seal one of the openings 18 and 20 of adapter 12, similar to adapter dust cap 22. Second end 104 of service blocking device 100 acts as a dust cap for ferrule 28 and the terminal end of the optical fiber of cable 14 held by ferrule 28, similar to connector dust cap 26. Body 106 is made of a material preferably sufficiently pliable to permit deforming to achieve an adequate seal of either ferrule 28 or either adapter end 18 and 20. Body 106 is also made of an optically opaque material, to prevent optical signals from passing between cables 14. Alternatively, body 106 may include an intermediate bulkhead 114 of body 106 which may be sized and shaped to closely match the size and shape of the opening in either first end 18 or second end 20 of adapter 12. Intermediate bulkhead 114 may extend across the light path between first end 102 and second end 104 and prevent passage of light signals through body 106 between the ends 102 and 104.

Body 106 may also include a keying feature 110 which engages a recess or slot of adapter 12 to properly orient first end 102 within adapter 12. Orientation of device 100 in adapter 12 helps ensure that extension 112 of first end 102 will mate with and provide a contamination seal about a split sleeve or other ferrule alignment feature within adapter 12. It is also anticipated that body 106 could be configured without such a keying feature 110.

Referring now to FIGS. 7 and 8, an alternative embodiment of a service blocking device 200 is shown. Device 200 includes a body 206 with a first end 202 and a second end 204. Second end 204 defines an opening 208 to receive connector 16. An alignment slot 212 in one side of opening 208 engages keying feature 36. Body 206 may also include an optional keying feature 210 adjacent first end 202 to engage a recess or slot in adapter 12. First end 202 further defines an opening 214 to permit a split sleeve or other ferrule alignment feature within adapter 12 to be received within body 206. Between first end 202 and second end 204, within body 206 is an optically opaque element which prevents light or optical signals from passing through service blocker device 200. Body 206 does not define a continuous light path between first end 202 and second end 204.

Body 206 also includes a first portion 216 adjacent first end 202 and a second portion 218 adjacent second end 204. First portion 216 is sized to fit within one of the ends 18 or 20 of adapter 12 and extend deep enough into adapter 12 so that opening 214 fits about and provides a seal from dust or other contamination about the ferrule alignment feature within adapter 12. Second portion 218 is sized to permit opening 208 to be large enough to accommodate a connector 16 but not so large as to interfere with connectors inserted within adjacently positioned adapters 12. Second portion 218 extends beyond the end of adapter 12 and offsets connector 16 away from adapter 12 to provide a quick visual indication of the position of service blocking device 200.

With reference to both bodies 106 and 206, it is desirable that at least a portion of the bodies extends outside of adapter 12 between adapter 12 and connector 16 to aid in the dissipation of any heat built up within the bodies. The optical signals whose passage through bodies 106 and 206 are being blocked are typically in the form of modulated laser light. Laser light, particularly at higher levels of energy that are being increasingly used in telecommunications, may cause a heat built up with bodies 106 and 206 as signals passing through cable 14 are blocked. This heat build up needs to be dissipated to prevent damage to cable 14, connector 16, ferrule 28 or adapter 12, or other equipment. By having at least a portion 116 of each body 106 (as shown in FIG. 1) or portion 218 of body 206 outside of adapter 12, the heat built up within the bodies may be more easily dissipated, as opposed to being confined within adapter 12. Additionally, at least these portions 116 and 218 of bodies 106 and 206, respectively, may be made of a material chosen for heat transmissive, or optical energy absorption or reflection qualities. These colors of the materials of devices 100 and 200 may also be selected to improve contrast with the other colors adjacent adapters 12, connectors 16 and cables 14 to improve the visual identification of circuits including devices 100 or 200.

Figure 9:
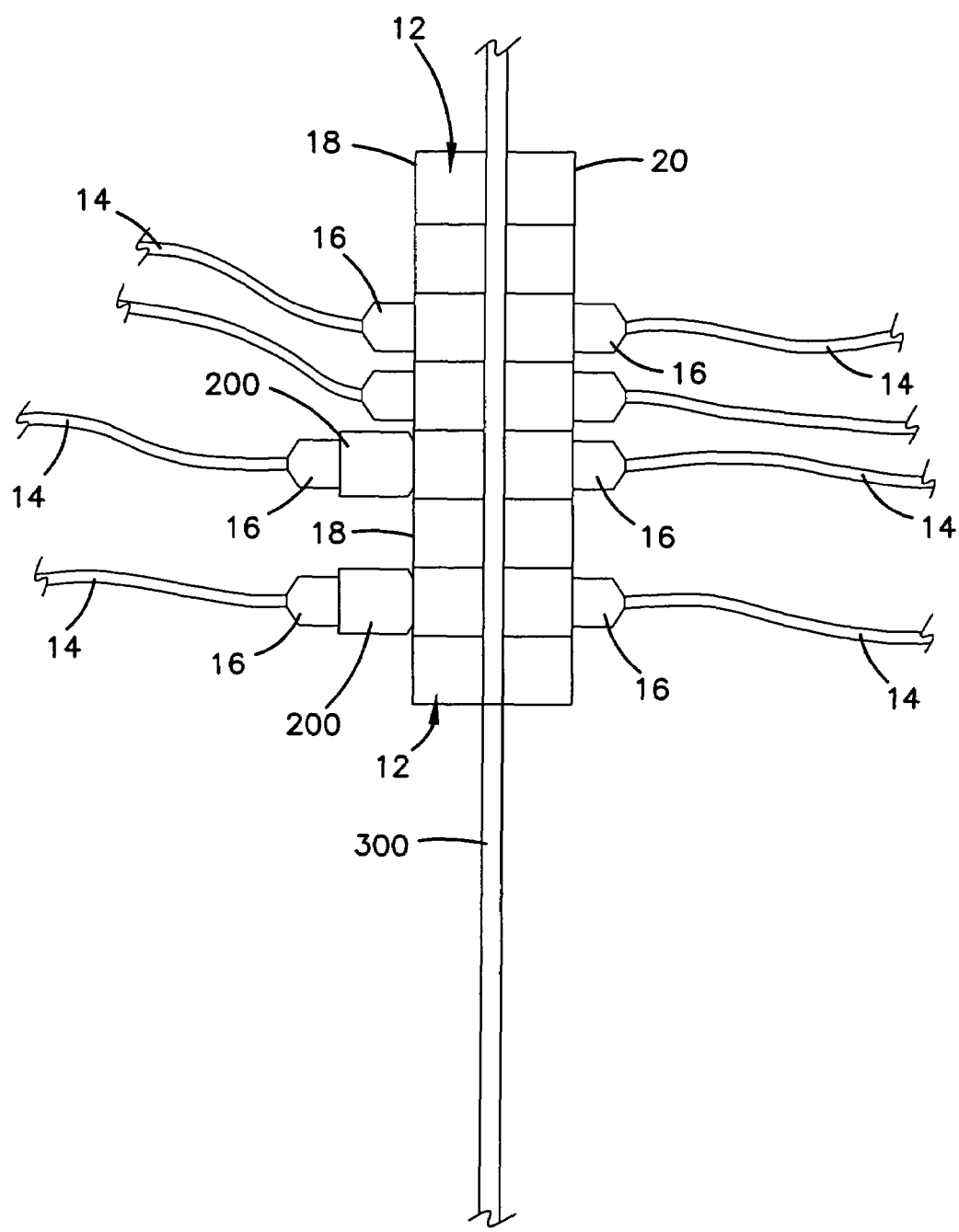
FIG. 9 is a side view of a bulkhead with a plurality of fiber optic adapters and fiber optic cables extending to the adapters.

FIG. 9 shows a bulkhead 300, such as might be included in a fiber optic module or panel, through which a plurality of fiber optic adapters 12 extend. First end 18 and second end 20 of adapters 12 are on opposite side of bulkhead 300. Cables 14 with connectors 16 extend to either end 18 or 20 of adapters 12. In some adapters 12, service blocking devices 200 are positioned between connector 16 of cable 14 and an opening in first end 18 of adapter 12. Another connector 16 of a corresponding cable 14 is inserted directly within the opposite end 20 of adapter 12. In other adapters 12, connectors 16 of cables 14 are inserted directly into both ends 18 and 20. Service blocking devices 200 position the inserted connectors 16 and cables 14 offset from the adapters, making these blocked cables easy to spot in the field by service personnel visiting the installation where bulkhead 300 is mounted.

Figure 10:
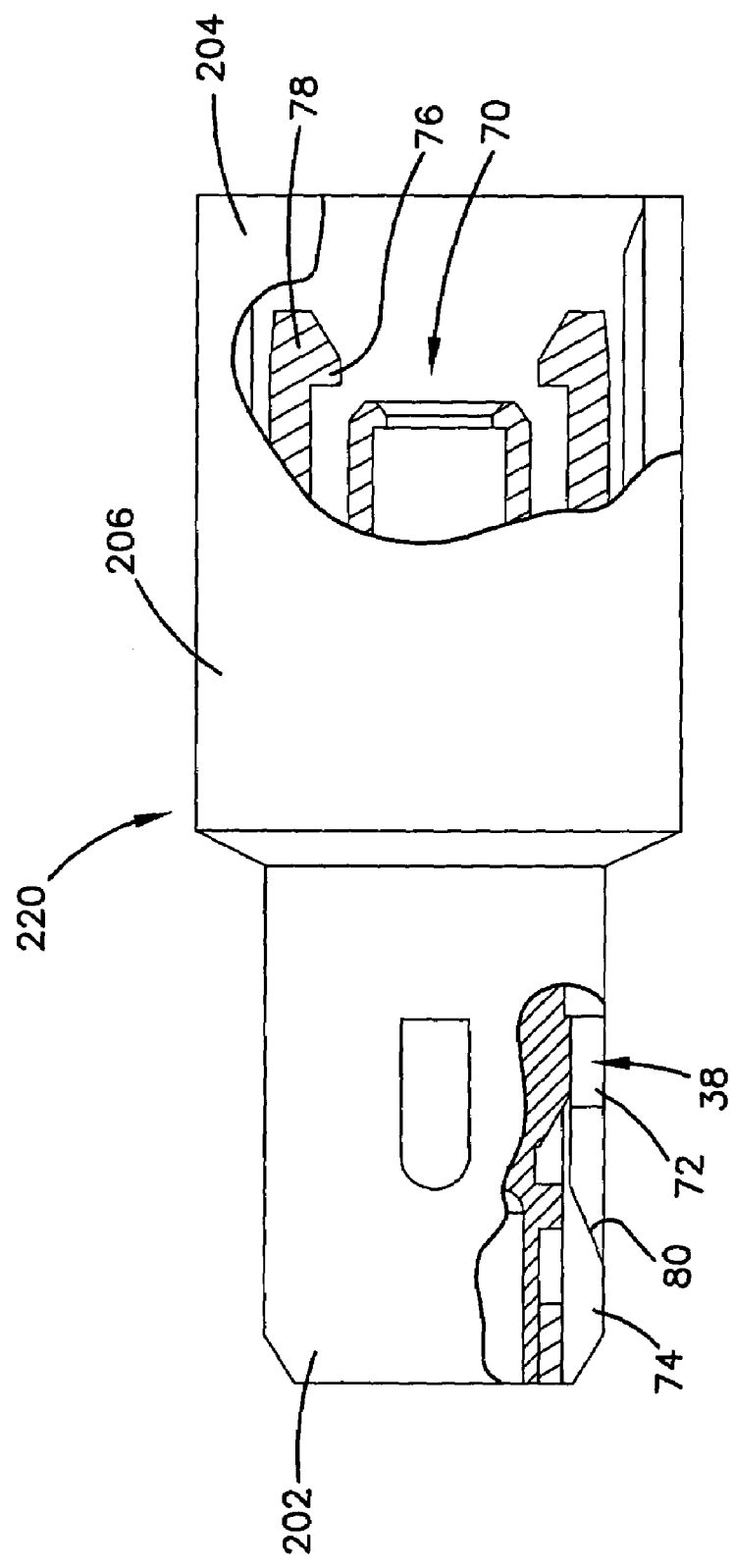
FIG. 10 is a partial cross-sectional view of a third embodiment of a service blocking device according to the present invention, showing releasable latches and engagement structures of the first and second ends of the device.
Figure 13:
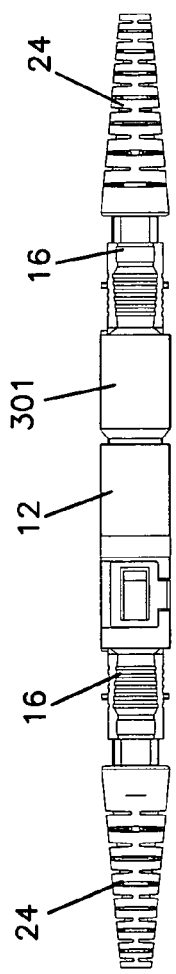
FIG. 13 is a side view of the connectors, adapter and service blocker of FIG. 11.
Figure 14:
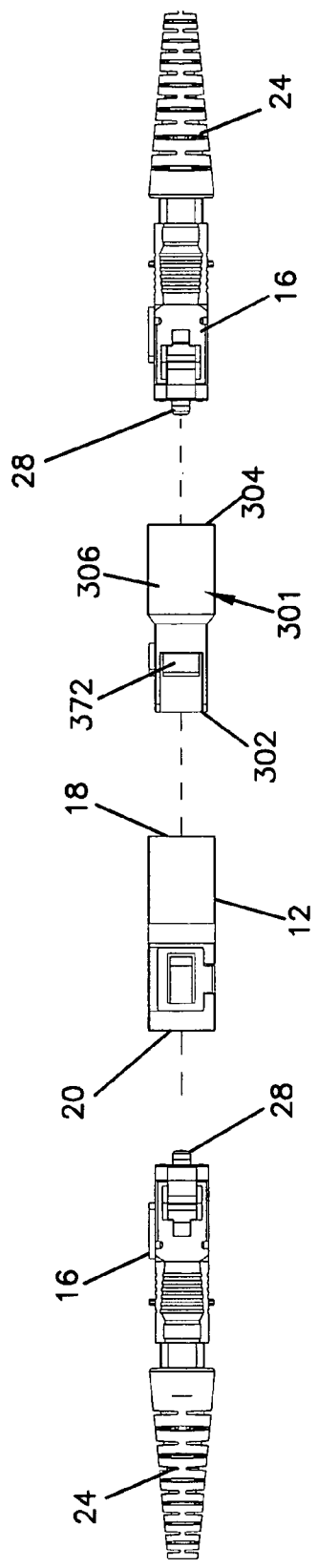
FIG. 14 is an exploded side view of the connectors, adapter and service blocker of FIG. 11.

Devices 100 and 200 may be releasably held with one of the ends 18 or 20 of adapter 12 by a friction fit or by a releasable mechanism, such as catch 38, included in connector 16 (shown in FIG. 4). Devices 100 and 200 may also include a friction fit or mating structure which mates with catch 38 for releasably holding connector 16. FIG. 10 illustrates a partial cross-sectional view of first end 202 of an alternative embodiment device 220 showing additional detail of catch 38. FIG. 10 also shows a partial cross-sectional view of second end 204 of device 220 with a mating structure 70. It is anticipated that ends 18 and 20 of adapter 12 may also include mating structures 70. Catch 38 of device 220 includes a recess 72 and a sliding portion 74. When first end 202 is inserted within adapter 12, a catch 76 on a distal end 78 of mating structure 70 engages recess 72 on either side of first end 202. The engagement of catches 76 and recesses 72 on opposite sides of first end 202 cooperate to hold device 220 within adapter 12.

To remove device 220 from adapter 12, a technician would grasp body 206 of which sliding portion 74 is an integral part, and pull body 206 away from adapter 12. Doing so will cause sliding portion 74 to translate relative to recess 72 so that tapered leading edge 80 engages catches 76 and urges them outward from recesses 72, deflecting mating structure 70. Once mating structure 70 has been sufficiently deflected outward, first end 202 of device 220 may be removed from adapter 12. Catch 38 of connector 16 is similarly configured to permit insertion within second end 204 of device 220 and engagement of mating structure 70 and subsequent disengagement of mating structure 70 and removal of connector 16 from second end 204.

Referring now to FIGS. 11 to 14, a fourth embodiment of a service blocker 301 according to the present invention is shown assembled with a pair of fiber optic connectors 16 and adapter 12. Service blocker 301 is a unitary device, preferably molded or otherwise formed as a unit including the blocking and latching features similar to those of service blockers 200 and 220, above. Service blocker 301 includes a body 306 with a first end 302 configured to be received within first end 18 of adapter 12 and a second opposite end 304 configured to receive connector 16 with ferrule 28. A recess 372 is included on a side of service blocker 301 adjacent first end 302 to provide a releasable latching capability in cooperation with catches within first end 18 of adapter 12.

Figure 15:
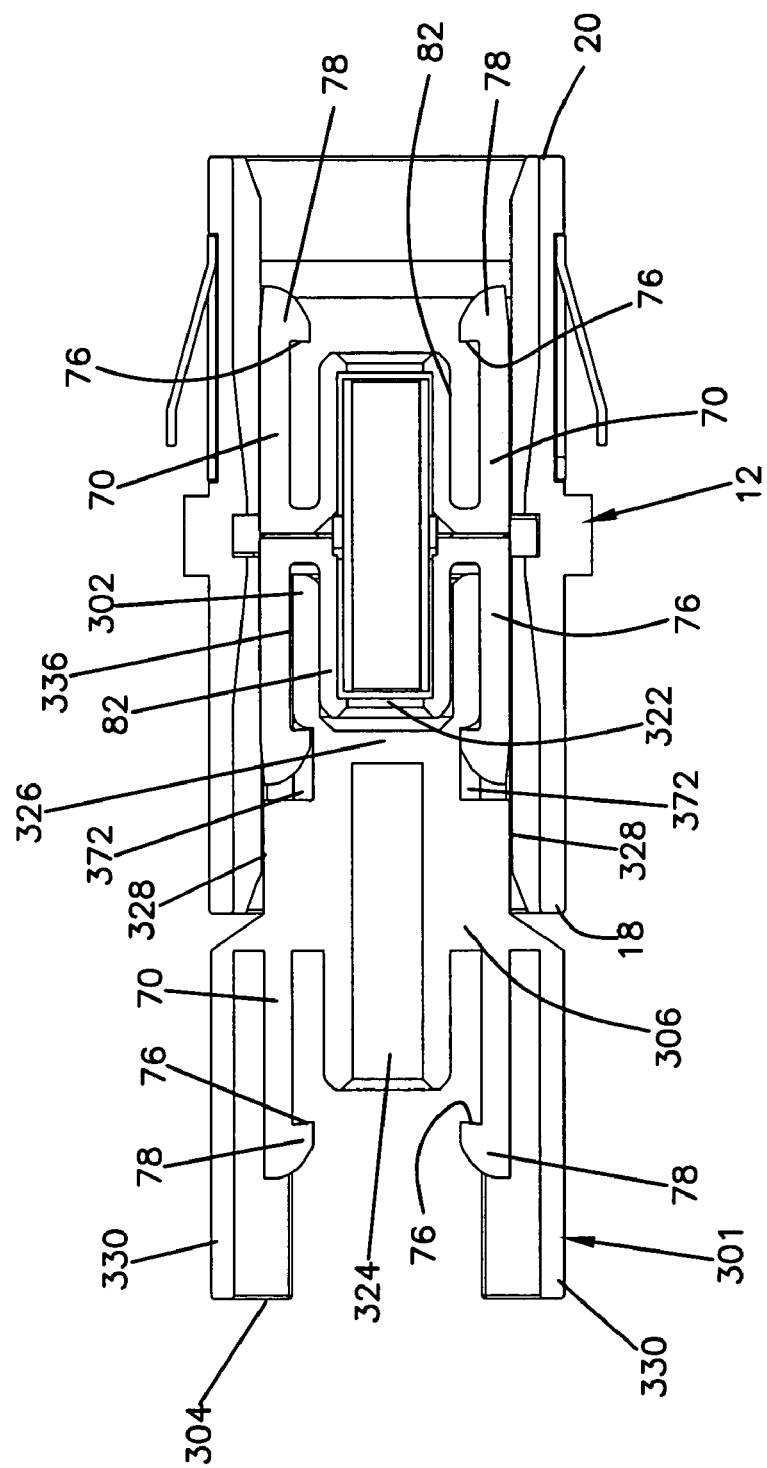
FIG. 15 is a top cross-sectional view of the service blocker of FIG. 1 inserted within one end of an adapter.

FIG. 15 illustrates how first end 302 of service blocker 301 engages within first end 18 of adapter 12. Distal ends 78 and catches 76 of latching structures 70 engage recesses 372 (shown in greater detail in FIG. 16, described below). Within second end 304, similar latching structures 70 are also included to engage recesses 72 of connectors 16, as shown above. Within first end 302 is a first opening 322 for receiving a ferrule sleeve arrangement 82 of adapter 12. Within second end 304 is a second opening 324 for receiving ferrule 28 of connector 16. An opaque bulkhead 326 is formed between the two openings 322 and 324 to prevent transmission of light between connector 16 and adapter 12. Opening 322 fits closely about sleeve arrangement 82 and provides a seal against entry of contaminants into sleeve arrangement 82. Opening 324 is sized to fit closely about ferrule 28 and provide a seal against contamination of the polished end face of any optical fiber held by ferrule 28.

Adjacent first end 302 are a pair of opposing sides 328 within which recesses 372 are formed. Adjacent second end 304 are a pair of opposing sides 330 and within second end 304, latching structures 70 are inset from sides 330 to provide space for outward deflection of latching structures 70, permitting insertion and extraction of connectors 16.

Figure 16:
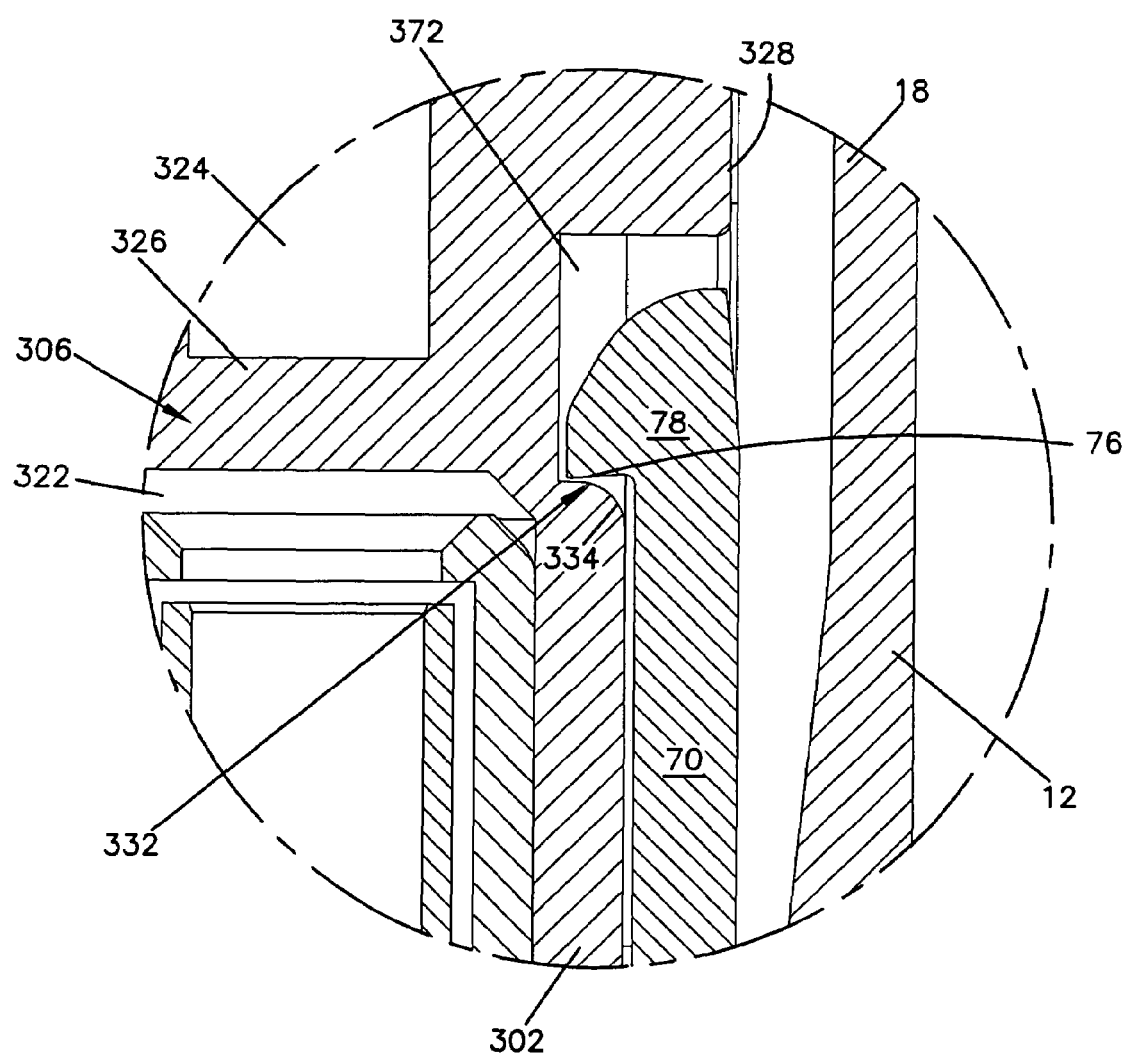
FIG. 16 is a closer cross-sectional view of a portion of FIG. 15, showing a catch of the adapter engaging a recess of the service blocker.

Referring now to FIG. 16, each recess 372 includes a tapered end wall 332 positioned toward first end 302. As described above with regard to service blocker 220, latching structures 70 are urged outward from recesses 72 by relative sliding longitudinal movement of portions of service blocker 220. With unitary body 306 of service blocker 301, it is not possible to have relative sliding longitudinal movement of portions of the service blocker to disengage latching structures 70 from recesses 372. Tapered end wall 332 engages catch 76 of latching structure 70 to provide resistance to withdrawal of service blocker 301 from first end 18 of adapter 12. However, when sufficient tension is placed on body 306 to urge service blocker 301 from adapter 12, tapered portion 334 will then deflect latching structures 70 outward, disengaging them from recesses 372 and permitting withdrawal of service blocker 301. Tapered portion 334 of end wall 332 is shown as a radiused curve. However, it is anticipated that tapered portion 334 could be of a different shape that provides a similar initial resistance to movement and then forces latching structures 70 outward. A series of planar ramped surfaces may be used, or a single planar ramp may be used in place of the radiused corner shown.

While referred to within this application as a service blocker, blocker 301 could also be utilized as a dust cap for a connector 16, without the other end of body 306 engaging an adapter 12. Similarly, it could be used as a dust cap for an adapter 12 without the other end of body 306 engaging a connector 16.

FIGS. 17 to 23 illustrate service blocker 301 including an optional keying feature 310. At second end 304, a bottom 338 and a top 340 may be removed from about ferrule opening 324. Removal of these portions of body 306 may add efficiency to the molding process if body 306 were to be cast or injection molded. This arrangement may also improve heat dissipation caused by the interruption of light signals by bulkhead 326. Adjacent first end 302 and recesses 372 within sides 328, shallower recessed portions 336 may provide a path for catches 76 to pass to and from recesses 372, and still permit first end 302 to maintain the same overall size as connector 16.

Figure 24:
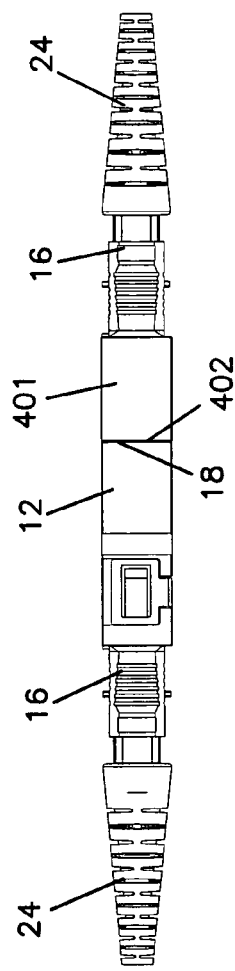
FIG. 24 is a side view of an alternative embodiment of the service blocker of FIG. 13.
Figure 25:
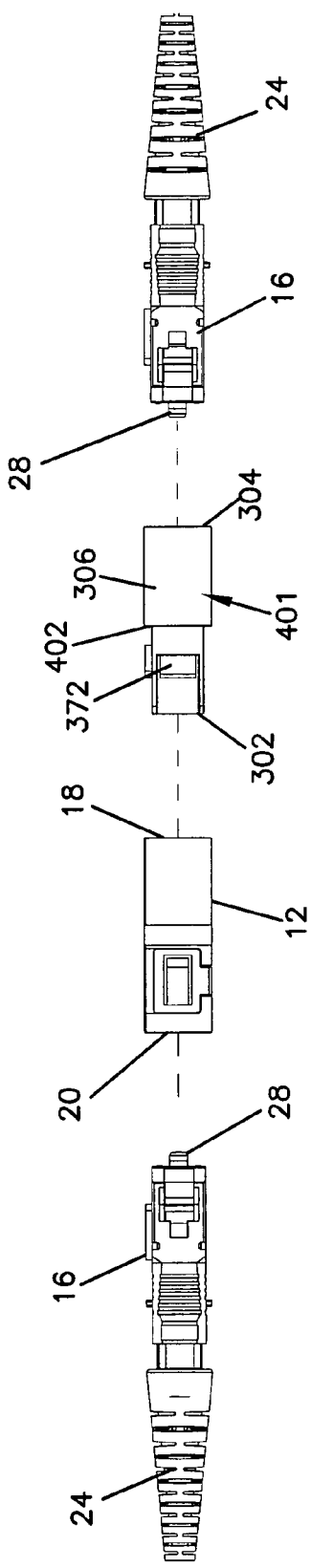
FIG. 25 is an exploded side view of the service blocker of FIG. 24.

FIGS. 24 and 25 illustrate an alternative embodiment 401 of a service blocker according to the present invention. The features of service blocker 401 are similar to service blocker 301 with the exception of an intermediate shoulder 402 positioned between the first and second ends. Shoulder 402 is more squared off than the tapered transition between the first and second ends of service blocker 301. Shoulder 402 is positioned to more closely fit against first end 18 of adapter 12 and provide improved protection to entry of contaminants into adapter 12.

It is anticipated that devices 100, 200, 220, 301 and 401 may be made of a relatively inexpensive and disposable material and that the devices may be simply discarded once they have been removed from an adapter in the field.

The above specification, examples and data provide a complete description of the manufacture and use of the invention. Since many embodiments of the invention can be made without departing from the spirit and scope of the invention, the invention resides in the claims hereinafter appended.

What is claimed is:

1. A service blocking device comprising:
   a unitary body with a first end and a second opposing end;
   the first end configured to be received within a mating opening of a fiber optic adapter;
   the second end including a connector opening sized to receive a fiber optic connector and a ferrule receiving opening within the connector opening, the ferrule receiving opening configured to receive a ferrule of a fiber optic connector, the fiber optic connector configured to be received within the mating opening of the fiber optic adapter;
   the body configured so that the fiber optic connector is held generally coaxially aligned with the opening of the adapter when the first end of the body is within the opening of the adapter and the connector is positioned within the opening of the second end;
   the body including an opaque bulkhead between the first end and the second end to prevent light from passing through the body, the body further comprising opposing sides adjacent the first end, each side including a recess for receiving one of a pair of opposing catches within the mating opening of the adapter, the catches and recesses cooperating to releasably hold the first end of the body within the mating opening.

2. The service blocking device of claim 1, wherein each of the recesses of the sides of the first end of the body includes a catch-engaging end wall, each end wall including a taper angled toward the first end.

3. The service blocking device of claim 2, wherein the taper of the end wall defines a radius.

4. The service blocking device of claim 1, wherein the first end includes an axial sleeve receiving opening extending into the body to fit about a ferrule receiving sleeve within the mating opening of the adapter, the sleeve receiving opening and the ferrule receiving opening of the body generally coaxially aligned.

5. The service blocking device of claim 1, wherein the second end of the body includes a pair of opposing catches configured to be received within recesses on sides of the fiber optic connectors received within the second end and releasably retain the connectors within the second end, the catches formed integrally with the body.

6. The service blocking device of claim 1, wherein the second end of the body is sized to not extend beyond a transverse cross-section of the adapter.

7. The service blocking device of claim 1, wherein the second end of the body includes a pair of open sides opposing one another.

8. The service blocking device of claim 1, wherein the body includes an interim squared shoulder positioned between the first end and the second end, the shoulder fitting closely against a first end of the adapter when the body is positioned within the mating opening of the adapter.

9. A service blocking device comprising:
   a unitary body with a first end and a second opposing end;
   the first end configured to be received within a mating opening of a fiber optic adapter;
   the second end including a connector opening sized to receive a fiber optic connector and a ferrule receiving opening within the connector opening, the ferrule receiving opening configured to receive a ferrule of a fiber optic connector, the fiber optic connector configured to be received within the mating opening of the fiber optic adapter;
   the body configured so that the fiber optic connector is held generally coaxially aligned with the opening of the adapter when the first end of the body is within the opening of the adapter and the connector is positioned within the opening of the second end;
   the body including an opaque bulkhead between the first end and the second end to prevent light from passing through the body;
   wherein the first end includes an axial sleeve receiving opening extending into the body to fit about a ferrule receiving sleeve within the mating opening of the adapter, the sleeve receiving opening and the ferrule receiving opening of the body generally coaxially aligned.

10. A service blocking device comprising:

a unitary body with a first end and a second opposing end;

the first end configured to be received within a mating opening of a fiber optic adapter;

the second end including a connector opening sized to receive a fiber optic connector and a ferrule receiving opening within the connector opening, the ferrule receiving opening configured to receive a ferrule of a fiber optic connector, the fiber optic connector configured to be received within the mating opening of the fiber optic adapter;

the body configured so that the fiber optic connector is held generally coaxially aligned with the opening of the adapter when the first end of the body is within the opening of the adapter and the connector is positioned within the opening of the second end;

the body including an opaque bulkhead between the first end and the second end to prevent light from passing through the body;

wherein the second end of the body includes a pair of opposing catches configured to be received within recesses on sides of the fiber optic connectors received within the second end and releasably retain the connectors within the second end, the catches formed integrally with the body.

11. A service blocking device comprising:

a unitary body with a first end and a second opposing end;

the first end configured to be received within a mating opening of a fiber optic adapter;

the second end including a connector opening sized to receive a fiber optic connector and a ferrule receiving opening within the connector opening, the ferrule receiving opening configured to receive a ferrule of a fiber optic connector, the fiber optic connector configured to be received within the mating opening of the fiber optic adapter;

the body configured so that the fiber optic connector is held generally coaxially aligned with the opening of the adapter when the first end of the body is within the opening of the adapter and the connector is positioned within the opening of the second end;

the body including an opaque bulkhead between the first end and the second end to prevent light from passing through the body;

wherein the second end of the body is sized to not extend beyond a transverse cross-section of the adapter.

12. A service blocking device comprising:

a unitary body with a first end and a second opposing end;

the first end configured to be received within a mating opening of a fiber optic adapter;

the second end including a connector opening sized to receive a fiber optic connector and a ferrule receiving opening within the connector opening, the ferrule receiving opening configured to receive a ferrule of a fiber optic connector, the fiber optic connector configured to be received within the mating opening of the fiber optic adapter;

the body configured so that the fiber optic connector is held generally coaxially aligned with the opening of the adapter when the first end of the body is within the opening of the adapter and the connector is positioned within the opening of the second end;

the body including an opaque bulkhead between the first end and the second end to prevent light from passing through the body;

wherein the second end of the body includes a pair of open sides opposing one another.

13. A service blocking device comprising:

a unitary body with a first end and a second opposing end;

the first end configured to be received within a mating opening of a fiber optic adapter;

the second end including a connector opening sized to receive a fiber optic connector and a ferrule receiving opening within the connector opening, the ferrule receiving opening configured to receive a ferrule of a fiber optic connector, the fiber optic connector configured to be received within the mating opening of the fiber optic adapter;

the body configured so that the fiber optic connector is held generally coaxially aligned with the opening of the adapter when the first end of the body is within the opening of the adapter and the connector is positioned within the opening of the second end;

the body including an opaque bulkhead between the first end and the second end to prevent light from passing through the body;

wherein the body includes an interim squared shoulder positioned between the first end and the second end, the shoulder fitting closely against a first end of the adapter when the body is positioned within the mating opening of the adapter.

* * * * *